(12) United States Patent
Yokota et al.

(10) Patent No.: US 9,101,993 B2
(45) Date of Patent: Aug. 11, 2015

(54) PORTABLE CUTTER

(75) Inventors: Tomoyoshi Yokota, Hitachinaka (JP); Tetsuo Ebata, Hitachinaka (JP); Shinji Kuragano, Hitachinaka (JP); Tomomasa Nishikawa, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 708 days.

(21) Appl. No.: 12/530,522

(22) PCT Filed: Jul. 17, 2008

(86) PCT No.: PCT/JP2008/063328
§ 371 (c)(1),
(2), (4) Date: Sep. 9, 2009

(87) PCT Pub. No.: WO2009/011454
PCT Pub. Date: Jan. 22, 2009

(65) Prior Publication Data
US 2010/0043768 A1   Feb. 25, 2010

(30) Foreign Application Priority Data

Jul. 17, 2007   (JP) .................................. 2007-185201

(51) Int. Cl.
| | |
|---|---|
| B23D 45/16 | (2006.01) |
| B23D 59/00 | (2006.01) |
| B27G 19/04 | (2006.01) |
| B27B 9/02 | (2006.01) |
| B28D 7/02 | (2006.01) |

(52) U.S. Cl.
CPC .............. *B23D 59/006* (2013.01); *B23D 45/16* (2013.01); *B27B 9/02* (2013.01); *B27G 19/04* (2013.01); *B28D 7/02* (2013.01)

(58) Field of Classification Search
USPC ....................................... 30/390, 391; 83/478
IPC ...................... B23D 45/16,59/006; B27G 19/04
See application file for complete search history.

(56) References Cited

U.S. PATENT DOCUMENTS 2,522,006 A * 9/1950 Wilcox ............................ 30/124
4,150,598 A * 4/1979 Berends et al. ................. 83/478

(Continued)

FOREIGN PATENT DOCUMENTS

| JP | 61-163802 A | 7/1986 |
|---|---|---|
| JP | H06-047683 Y2 | 7/1994 |
| JP | 10-272622 A | 10/1998 |

OTHER PUBLICATIONS

Office Action of Corresponding Chinese Patent Application with English translation, dated Jul. 14, 2010 (9 pages).

*Primary Examiner* — Kenneth E Peterson
(74) *Attorney, Agent, or Firm* — Kilpatrick Townsend & Stockton LLP

(57) ABSTRACT

A portable cutter has a base member, a main body, a cutting blade, a protection member, a dust collection member, and a guide member. The base member moves on a workpiece, the base member having a shaft provided in proximity to one end thereof. The main body is coupled to the base member. A posture of the main body with respect to the base member is changeable. The cutting blade is attached to the main body and driven to cut the workpiece. The cutting blade has an outer periphery. The protection member covers a part of the outer periphery of the cutting blade. The dust collection member has an inlet provided in proximity to the outer periphery of the cutting blade for drawing and collecting dust. The guide member is pivotably supported to the shaft of the base member for guiding the dust to the opening of the dust collection member.

7 Claims, 10 Drawing Sheets

(56) References Cited

U.S. PATENT DOCUMENTS

| | | | |
|---|---|---|---|
| 4,255,995 A * | 3/1981 | Connor | 83/100 |
| 5,084,972 A * | 2/1992 | Waugh | 30/124 |
| 5,327,649 A | 7/1994 | Skinner | |
| 5,537,748 A * | 7/1996 | Takahashi et al. | 30/124 |
| 6,269,543 B1 * | 8/2001 | Ohkouchi | 30/391 |
| 6,612,038 B2 * | 9/2003 | Onose et al. | 30/391 |
| 2002/0133954 A1 * | 9/2002 | Bruce et al. | 30/391 |

* cited by examiner rear ← → front

PORTABLE CUTTER

CROSS REFERENCE TO RELATED APPLICATIONS

This application is a National Stage of International Application No. PCT/JP2008/063328 filed Jul. 17, 2008 and which claims the benefit of Japanese Patent Application No. 2007-185201, the disclosures of all applications being incorporated herein by reference.

TECHNICAL FIELD

The present invention relates to a portable cutter having a dust collection cover for collecting dust generated from a workpiece.

BACKGROUND ART

An Electric cutter for cutting a concrete block and a tile has been well-known. The electric cutter has a drive unit such as an electric motor or an engine, a circular saw blade coupled to the shaft of the motor or engine, and a protection cover surrounding the outer periphery of the circular saw blade to prevent dust from scattering. When cutting is performed with such an electric cutter, it is difficult to prevent dust from scattering. Even if a workpiece is cut a little by the cutter, the generated dust may inevitably lower visibility at the working site. Therefore, a user is required to wear a dust-free mask and/or protective goggles whenever using the electric cutter.

Japanese Patent Application Publication No. 2002-046018 discloses an electric cutter that has a dust collecting hose attached to a protection cover of a main body. The dust-collecting hose is connected to an electric dust collector. The electric dust collector draws and collects the dust generated during the cutting operation.

Japanese Patent Application Publication No. 2004-058388 discloses a cutter having a base for moving on a workpiece while cutting operation, and a coil spring interposed between the base and a wheel cover. The coil spring urging the wheel cover away from the base, so that the cutter can collect the dust generated from the workpiece effectively.

With the conventional cutters, the scattering direction of the dust may change as the cutting depth by the blade. Therefore, it is difficult to collect all dust only by the wheel cover. For example, the dust generated by the cutting operation generally scatters almost parallel to the surface of the workpiece. When the dust collides with the wheel cover at almost right angles to the inner surface of the wheel cover, the dust is guided into the inlet port of the wheel cover. Thus, the larger the diameter of the blade, the faster the dust scatters from the blade in the tangential direction of the blade. If the scattering speed of the dust is higher, the dust may not be guided into the inlet port of the wheel cover after the dust collides with the inner surface of the wheel cover.

To solve the problem mentioned above, the sides of the wheel cover are required to be covered with another cover. When the sides of the wheel cover are covered with another cover, the entire blade would be covered, so that the user can hardly look at a cutting-start position or a cutting-end position. The user has to make a mark on a line of the workpiece extending from the peripheral surface of the base or the wheel cover, and aligning the cutting line with the mark, thereby confirming the position of the blade. Thus, it is difficult for the user to cut the workpiece at any desired position with high accuracy.

To enable the user to place the blade at any position precisely, the wheel cover may have an observation window in one side. Alternatively, the user may lift the base from the workpiece to confirm the position of the blade. In either case, the scattered dust still leaks through the observation window or the gap between the base and the workpiece to outside, which lowers the dust collecting efficiency.

DISCLOSURE OF INVENTION

An object of the present invention is to provide a portable cutter in which dust can be efficiently guided into the inlet port of the dust collection cover, regardless of a cutting depth to which the blade cuts into the workpiece.

The present invention features a portable cutter having a base member, a main body, a cutting blade, a protection member, a dust collection member, and a guide member. The base member moves on a workpiece, the base member having a shaft provided in proximity to one end thereof. The main body is coupled to the base member. A posture of the main body with respect to the base member is changeable. The cutting blade is attached to the main body and driven to cut the workpiece. The cutting blade has an outer periphery. The protection member covers a part of the outer periphery of the cutting blade. The dust collection member has an inlet provided in proximity to the outer periphery of the cutting blade for drawing and collecting dust. The guide member is pivotably supported to the shaft of the base member for guiding the dust to the opening of the dust collection member.

According to the present invention, the guide member for guiding dust into the inlet port of the dust collection cover is rotatably provided to the shaft of the base unit. Preferably, the urging means pivotably moves the guide member about the shaft to urge the guide member to the workpiece. Therefore, the guide member keeps contacting an upper surface of the workpiece even when the posture of the base unit with respect to the main body is changed to change the cutting depth. The guide member can therefore smoothly guide the dust into the inlet of the dust collection member, preventing the dust flying in the tangential direction of the blade from leaking out of the protection member. Thus, the dust from the workpiece can be collected at higher efficiency without excessively covering the periphery of the blade. The above structure enables a user to visually confirm the how the workpiece is being cut at the start and end of a cutting process as well as during the cutting process.

Preferably, the guide member has a guide wall portion directed to the opening of the dust collection member. The guide wall portion has a lower end and two side ends. Therefore, the dust is smoothly guided into the inlet of the dust collection member with the guide wall portion. This structure helps to collect the dust at a higher efficiency.

Preferably, the guide member further includes two side wall portions coupled to the side ends of the guide wall portion, respectively, each side wall portion having a lower end. the guide member is configured to contact the lower ends of the side wall portions and the lower end of the guide wall portion simultaneously with the workpiece when the one end of the base is contact with the workpiece for cutting.

Accordingly, the base unit is inclined to the workpiece at the start of the cutting process and abuts one end of the base unit on the workpiece. At this time, the lower ends of the side wall portions and the lower end of the guide wall portion simultaneously contact with the workpiece. Thus, the guide member surrounds a cutting point of the workpiece by the cutting blade without any gap between the side wall portions and the guide wall portion of the guide member and the workpiece so that the dust generated from the workpiece is prevent from scattering out of the protection cover and the dust collection member. That is, the guide member smoothly guides all dust into the inlet of the dust collection cover. The dust is therefore reliably collected.

Preferably, the lower end of the guide wall portion is kept contact with the workpiece when the guide member is positioned above the lower surface. Therefore, when a lower surface of the base unit contacts with the workpiece, the lower end of the guide wall portion is kept contact with the workpiece, so that no gap develops between the guide member and the workpiece. Hence, the dust can be efficiently guided by the guide member into the inlet of the dust collection cover without leaking out of the dust collection member. The dust is thus reliably collected.

Preferably, the dust collection member is made from an elastic member. The workpiece is not damaged, even if the dust collection cover collides with the workpiece.

Preferably, the guide member is positioned inside of the opening of the dust collection member. Accordingly, the dust from the workpiece can be reliably guided to the inlet of the dust collection member, even if the dust collection cover becomes deformed.

BRIEF DESCRIPTION OF THE DRAWINGS

The particular features and advantages of the invention as well as other objects will become apparent from the following description taken in connection with the accompanying drawings, in which.

Figure 1:
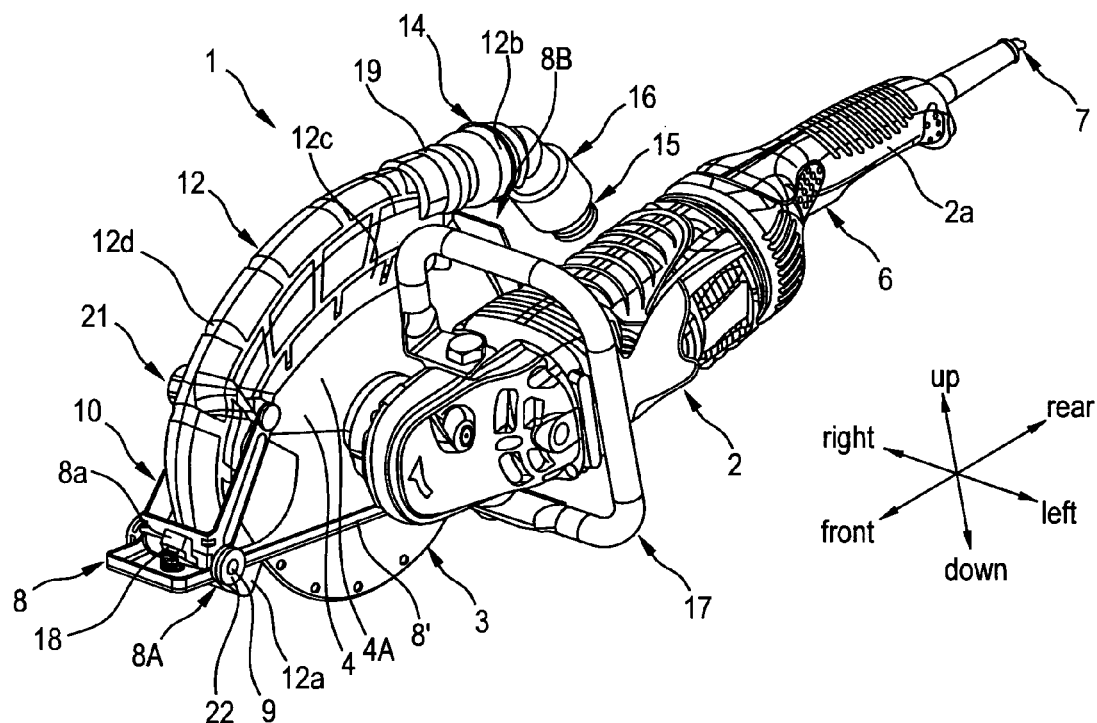
FIG. 1 is a perspective view of an electric cutter according to the present invention.

BRIEF EXPLANATION OF REFERENCE NUMERALS 1 portable cutter
2 main body
3 cutting blade
4 protection cover
5 drive shaft
8 base unit
8A guide member
12 inlet port

BEST MODE FOR CARRYING OUT THE INVENTION

A portable cutter according to an embodiment of the present invention will be described with reference to the accompanying drawings. The expressions "front", "rear", "above", "below", "left", and "right" are used throughout the description to define the various parts when the portable cutter is disposed in an orientation in which it is intended to be used.

As shown in FIG. 1, an electric portable cutter 1 has a main body 2, a circular saw blade 3, a protection cover 4, a base unit 8, and a dust collection cover 12. The circular saw blade 3 is attached to the right-front part of the main body 2 and can be rotated. The protection cover 4 protects the circular saw blade 3. The base unit 8 is used to adjust a cutting depth to which a workpiece is cut with the circular saw blade 3. The dust collection cover 12 is attached to the protection cover 4.

Figure 3:
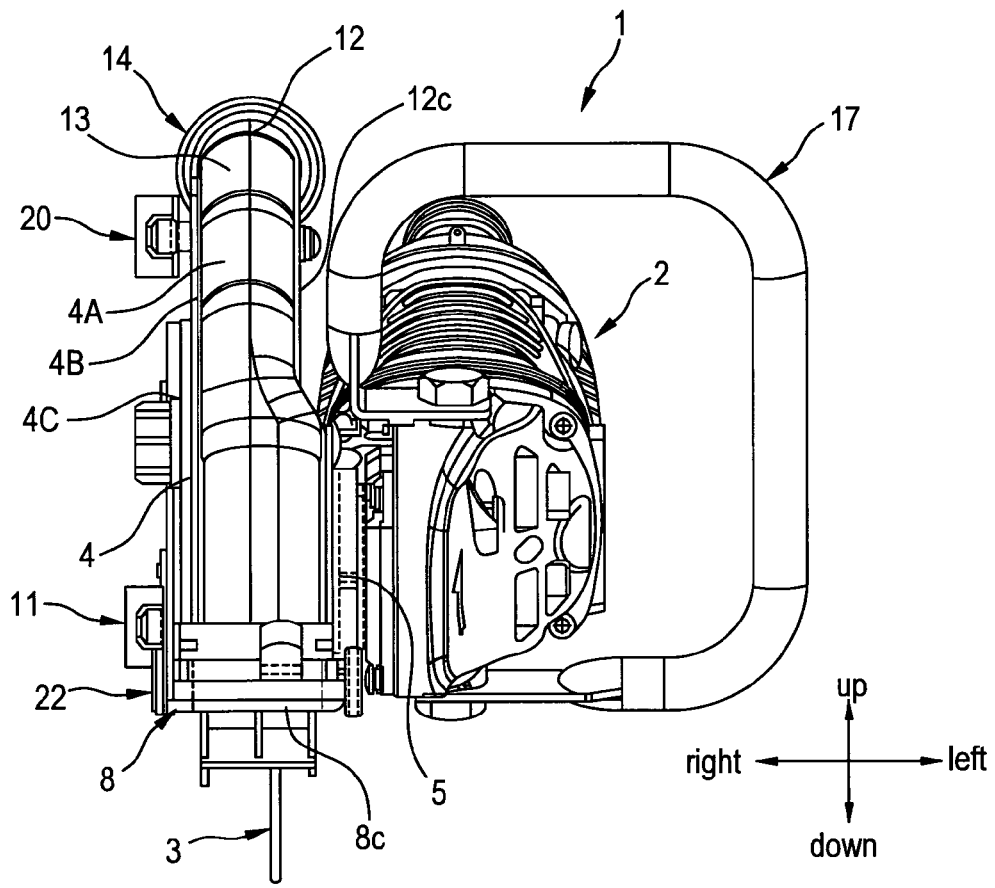
FIG. 3 is a front view of the electric cutter shown in FIG. 1.

The main body 2 incorporates an electric motor (not shown) that is used as a drive unit. As shown in FIG. 3, the center of the circular saw blade 3 is secured to a rotating shaft 5 of the electric motor. The main body 2 has a handle unit 2a at the rear part. The handle unit 2a holds a switch 6 which turns on or off the electric motor when operated. A power cord 7 is connected to the handle unit 2a to supply power to the electric motor.

A sub-handle 17 is provided on the front portion of the main body 2 and located on the left side of the blade 3. The sub-handle 17 is formed by bending and shaping a pipe like a rectangular frame as viewed from the front. A user can hold the handle unit 2a and the sub-handle 17 at the same time. The user can therefore hold the electric cutter 1 steadfast and stably set the circular saw blade 3 to the workpiece W.

Figure 2:
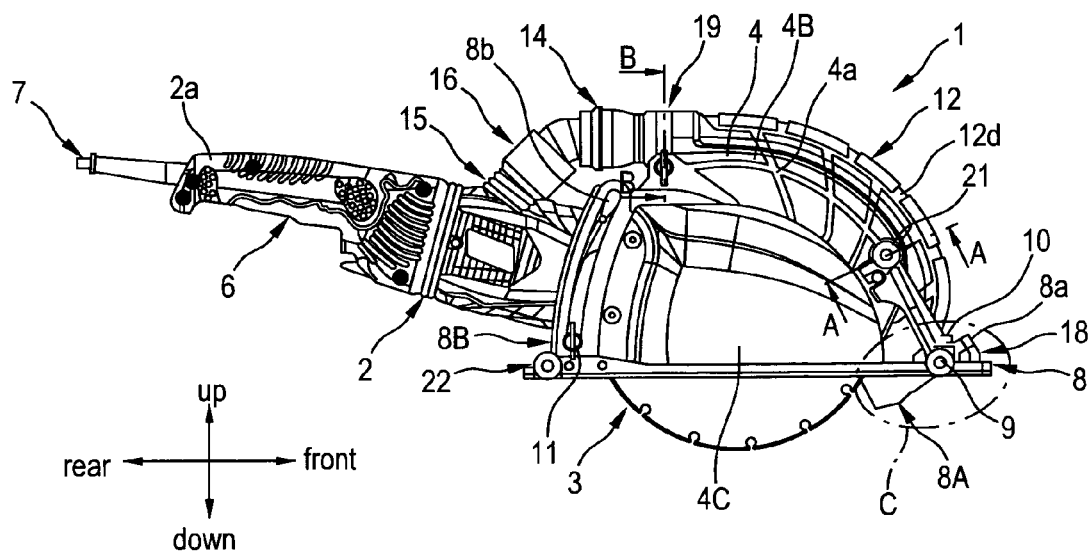
FIG. 2 is a side view of the electric cutter shown in FIG. 1.

The protection cover 4 includes a first protection cover 4A (FIG. 1), a second protection cover 4B, and a third protection cover 4C (FIG. 2). The first protection cover 4A is attached to the main body 2, covering the outer periphery of the circular saw blade 3 and a part of one side thereof. The second protection cover 4B is fastened to first protection cover 4A, covering a part of the other side of the blade 3. The third protection cover 4C is fastened to the base unit 8 to cover the other side of the circular saw blade 3 together with the second protection cover 4B. The first protection cover 4A is made from a hard material such as aluminum. The second protection cover 4B and the third protection cover 4C are made of resin such as polycarbonate.

The base unit 8 is composed of a rectangular frame 8' made of metal and surrounding the circular saw blade 3. A shaft 9 couples the front-end portions of the opposing longer sides of the base unit 8 (see FIG. 1). The ends of the shaft 9 are rotatably coupled to a pair of connecting members 10 made of metal, respectively. More precisely, one end of the shaft 9 is coupled to one end of one connecting member 10, and the other end of the shaft 9 is coupled to one end of the other connecting member 10. Further, the other end of one connecting member 10 is movably coupled to the first protection cover 4A with a knob bolt 21, and the other end of the other connecting member 10 is movably coupled to the second protection cover 4B with the knob bolt 21. Hence, when the connecting members 10 are rotated about the shaft 9, the posture of the base unit 8 with respect to the main body 2 can be changed. If the posture of the base unit 8 with respect to the main body 2 is changed, the length of the circular saw blade 3 projecting from the base unit 8 can be changed. In other words, the cutting depth of the circular saw blade 3 can be adjusted.

The base unit 8 has the function of adjusting the cutting depth to which the circular saw blade 3 can cut the workpiece, and the function of moving the blade 3 on the workpiece W in a stable state. Therefore, the base unit 8 has two pairs of rollers 22 at the front end and the rear end in order to move smoothly on the workpiece W.

As shown in FIG. 2, the base unit 8 has a front guide 8A close to the front end and a rear guide 8B close to the rear end. The front guide 8A is rotatably coupled to the shaft 9. The front guide 8A will be described later in detail. The rear guide 8B extends to intersect almost at right angles to the plane including the frame 8' of the base unit 8. The rear guide 8B is shaped like a channel, surrounding the circular saw blade 3 from both sides. The rear guide 8B has the side faces, each having an arch-shaped guide groove 8b. An adjuster 11 is inserted in both guide grooves 8b and threadly engaged to any desired position of the main body 2. When the adjuster 11 is fastened, the rear guide 8B is secured to the main body 2. Therefore, the position of the base unit 8 with respect to the main body 2 can be changed by changing the position of the adjuster 11 with respect to the guide groove 8b. Hence, the cutting depth to which the circular saw blade 3 cuts the workpiece W can be adjusted. Note that the third protection cover 4C is fastened to the base unit 8 to straddle the front end of the rear guide 8B and the frame 8' of the base unit 8.

Figure 4:
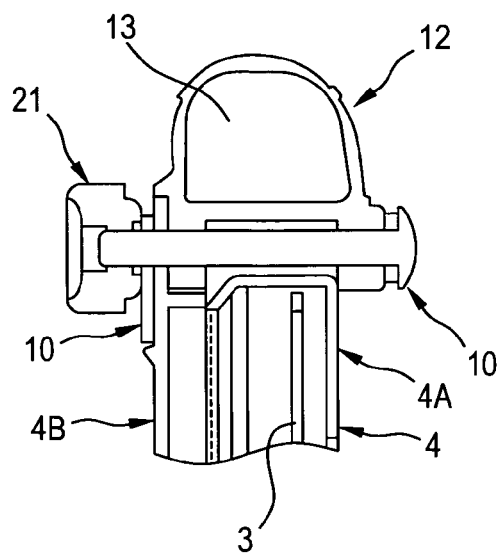
FIG. 4 is a sectional view taken along lines of A-A shown in FIG. 2.
Figure 5:
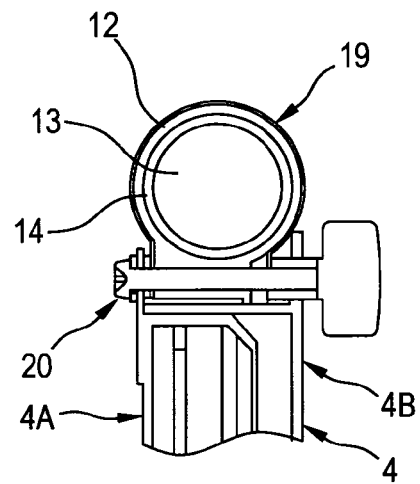
FIG. 5 is a sectional view taken along lines of B-B shown in FIG. 2.

The dust collection cover 12 is attached to the first protection cover 4A to extend along the periphery of the first protection cover 4A. The dust collection cover 12 is shaped like a tube. The dust collection cover 12 has two opening ends, and is made of elastic material such as rubber, soft urethane resin, and thermoplastic resin. As shown in FIGS. 4 and 5, the space inside the dust collection cover 12 defines a dust passage 13.

One opening end of the dust collection cover 12 is a inlet port 12a that opens to the outer periphery of the circular saw blade 3. The other opening end of the dust collection cover 12 is an outlet port 12b. An adapter 14 made from resin has one end connected to the outlet port 12b by a band 19 that is made of metal. The other end of the adapter 14 is inserted into the hose cap 16 attached to one end of a hose 15. The other end of the hose 15 is connected to a dust collector (not shown).

Figure 12:
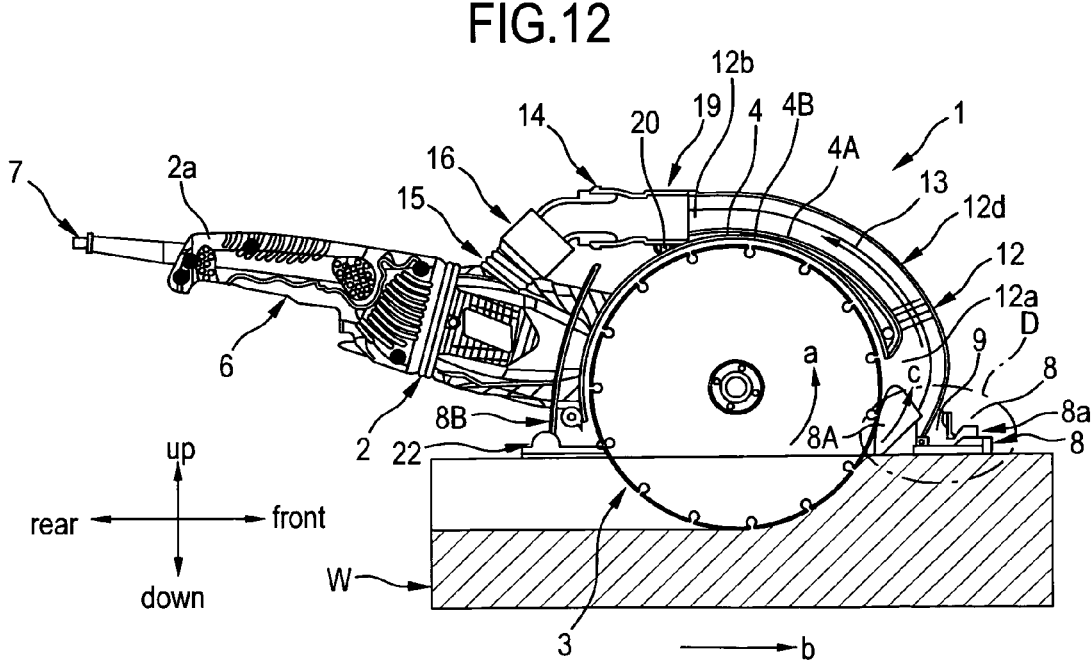
FIG. 12 is a partially sectional view showing the electric cutter cutting a workpiece at a deeper depth.

As shown in FIG. 4, one end of the dust collection cover 12 located near the inlet port 12a is fastened to the top of one connecting member 10 by the knob bolt 21. As shown in FIG. 12, the other end of the dust collection cover 12, which lies near the outlet port 12b, is fastened to the second protection cover 4B together with the band 19 by screws 20.

The dust collection cover 12 has an extension portion 12c that has a thin thickness and extends downwards. The extension portion 12c overlaps the outer surface of the first protection cover 4A. If the back surface of the extension portion 12c is secured to one side of the first protection cover 4A with a double-sided adhesive tape, the extension portion 12c does not remove from the side surface of the first protection cover 4A to hinder the cutting of the workpiece W. This is desirable in view of safety.

A plurality of grooves 12d, each having a depth of about 0.5 mm, is made in the entire surface of the dust collection cover 12. The grooves 12d intersect with one another and extend from front to rear, from left to right, and up and down. As shown in FIG. 2, a plurality of grooves 4a are made in the side surface of the second protection cover 4B and are connected to the grooves 12d made in the dust collection cover 12.

Figure 6:
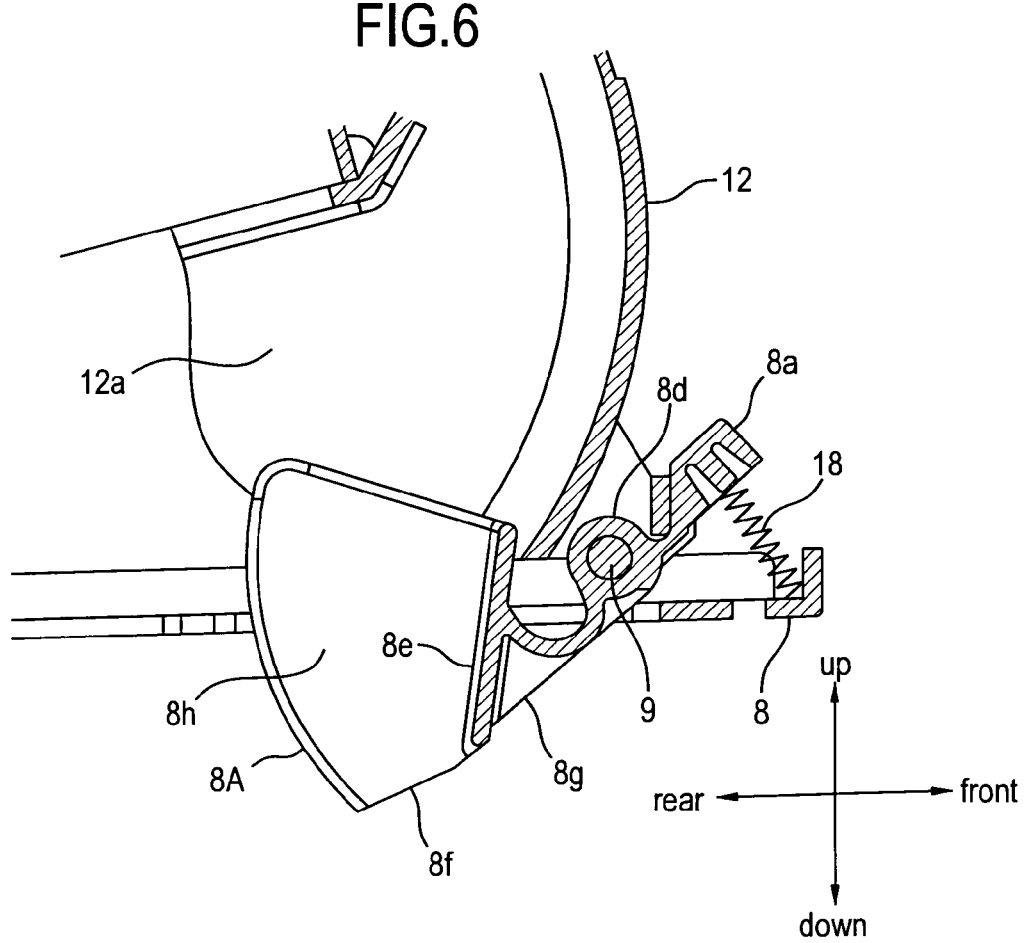
FIG. 6 is a partial sectional view showing a front edge of the base unit and a front guide.
Figure 7:
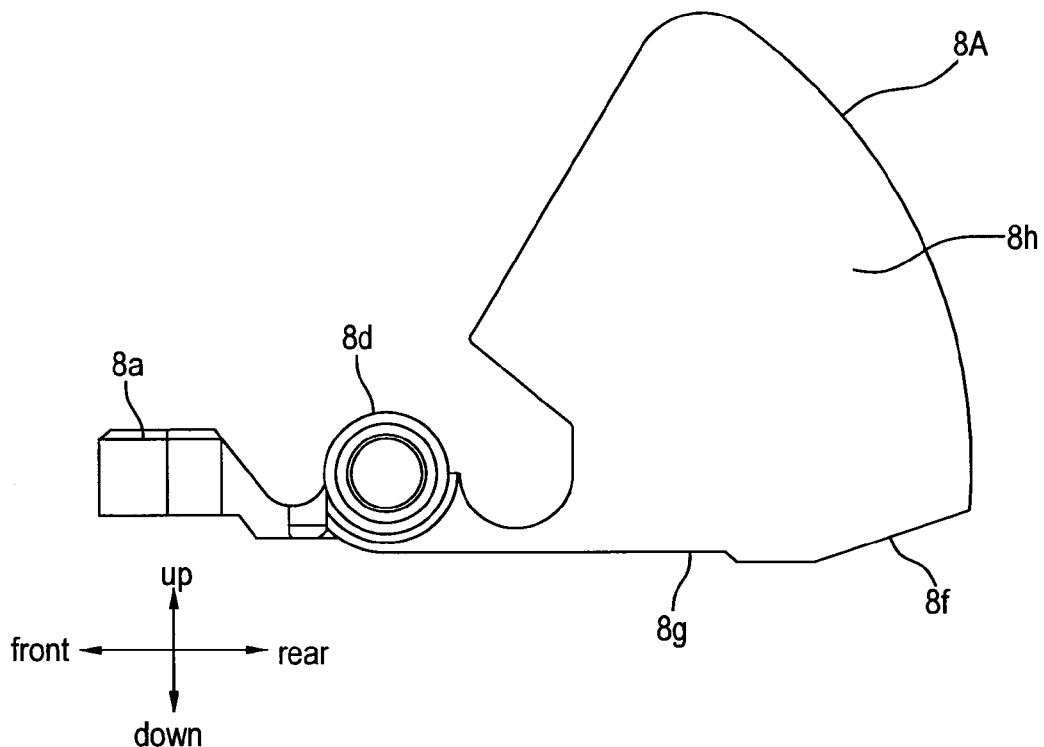
FIG. 7 is a side view of the front guide.
Figure 8:
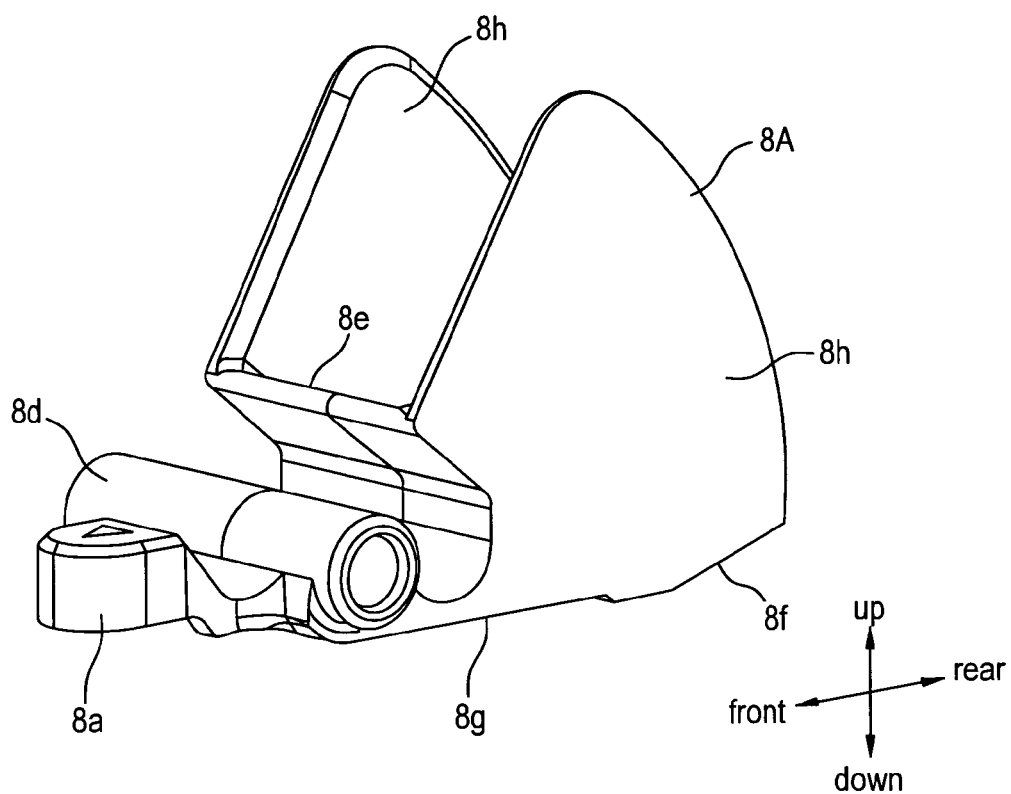
FIG. 8 is a perspective view of the front guide, as seen from the font.
Figure 9:
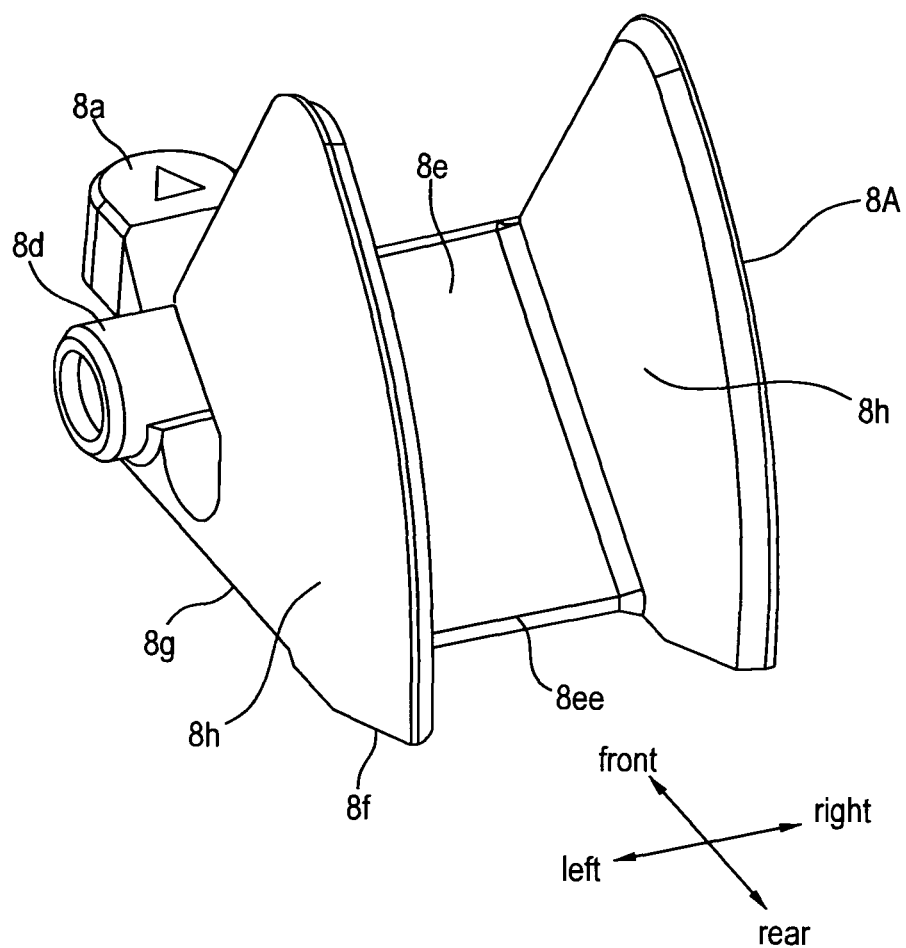
FIG. 9 is a perspective view of the front guide, as seen from the rear.

The front guide 8A will now be described in detail. As shown in FIGS. 7, 8 and 9, the front guide 8A is a member having a cross section shaped like U. The front guide 8A has a boss 8d and a projection 8a. The shaft 9 extends through the boss 8d. The projection 8a extends forwards from the boss 8d. Once the front guide 8A is attached to the shaft 9 of the base unit 8, the projection 8a is biased upwards by a spring 18 interposed between the front end of the base unit 8 and the projection 8a, as shown in FIG. 6. As a result, the rear portion of the front guide 8A is rotated about the shaft 9 and biased downwards. When the front guide 8A is attached to the shaft 9 of the base unit 8, the front guide 8A is positioned inside the inlet port 12a of the dust collection cover 12.

Figure 11:
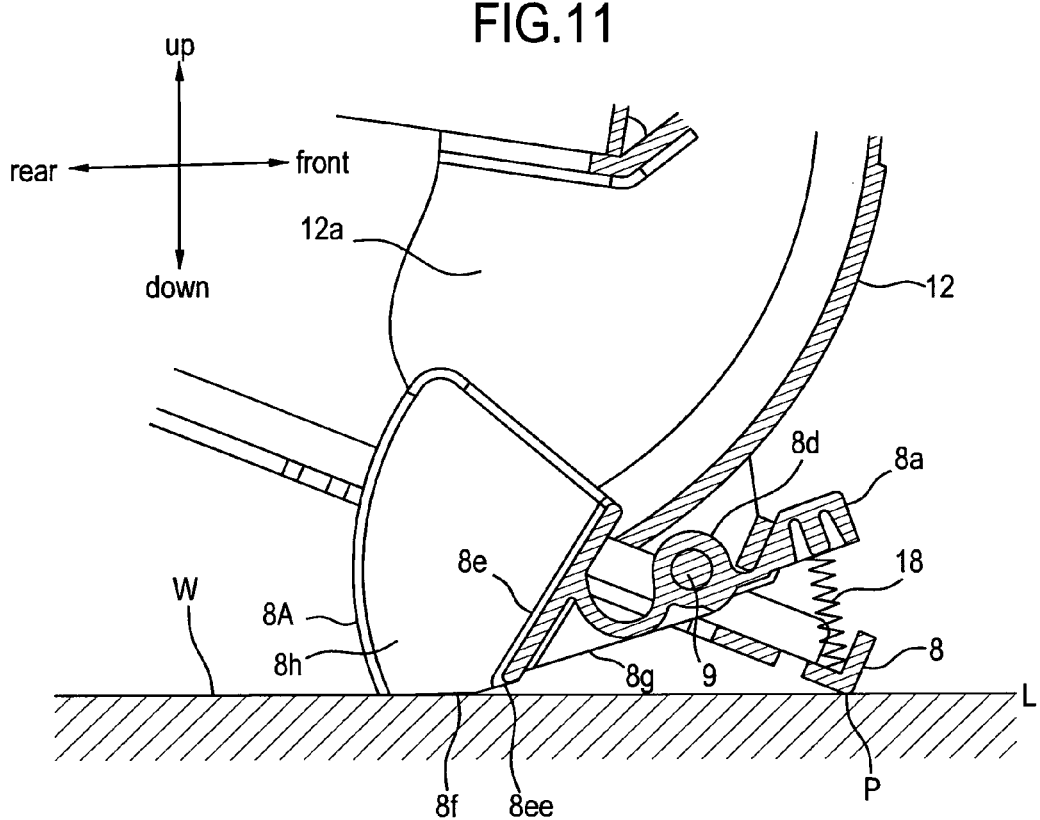
FIG. 11 is a partially sectional view illustrating the positional relation between the base unit and the front guide on the workpiece when the electric cutter starts cutting the workpiece.

As shown in FIGS. 8 and 9, the front guide 8A has a guide wall portion 8e and two sidewall portions 8h and 8h. The guide wall portion 8e is configured to be directed to the inlet port 12a of the dust collection cover 12. The guide wall portion 8e has a rectangular shape with a lower side end 8ee. The sidewalls portions 8h and 8h are shaped like a fan and coupled to the side ends of the guide wall surface 8e, respectively. The sidewall portion 8h has a prescribed thickness and has two contact portions 8f and 8g at the lower end. The contact portions 8f and 8g are continuous to each other. As shown in FIG. 11, the contact portion 8f is a portion that linearly comes to contact the workpiece W together with the lower side end 8e e of the guide wall portion 8e when the circular saw blade 3 starts cutting the workpiece W. The contact portion 8f is configured that the line L extending from the contact portion 8f passes a contact point P, the front end of the base unit 8, where the base unit 8 contacts the workpiece W. Thus, the lower side end 8e e and the contact portions 8f of the front guide 8A contact the surface of the workpiece W to surround the cutting portion of the workpiece W without providing any gap between the workpiece W and the lower side end 8ee and the contact portions 8f of the front guide 8A.

Figure 13:
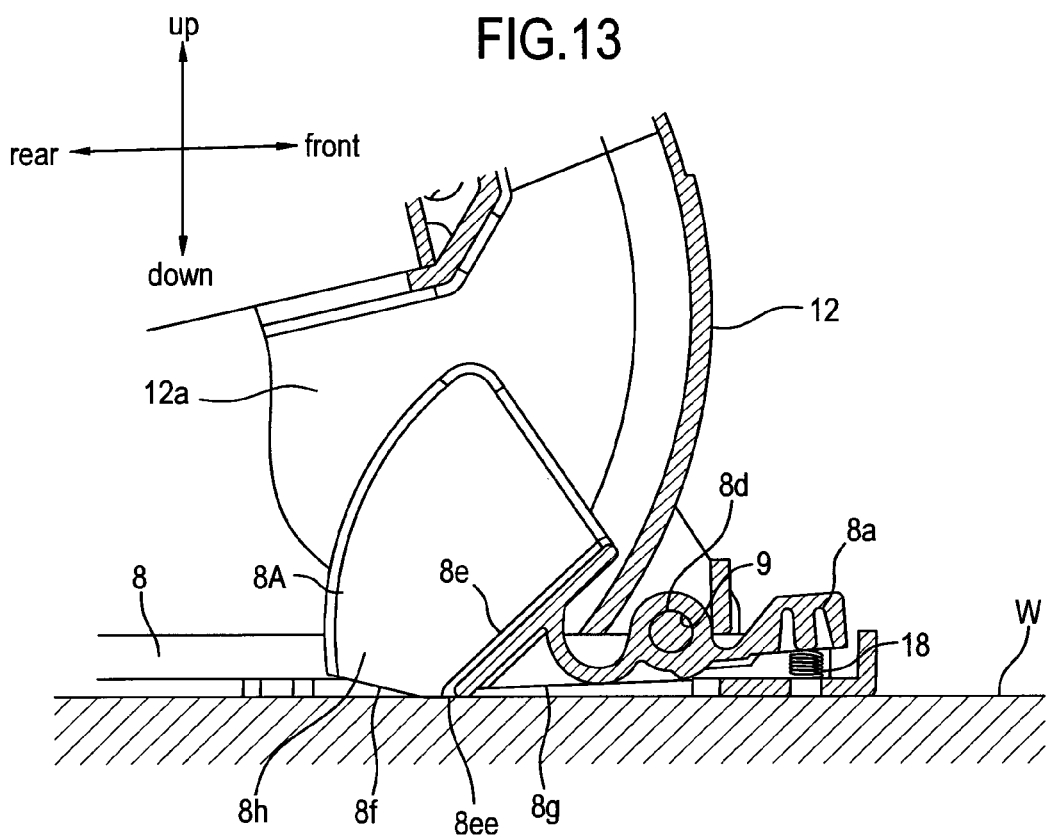
FIG. 13 is a partially sectional view illustrating the positional relation between the base unit and the front guide when the electric cutter cuts a workpiece at a shallower depth.

Referring to FIG. 13, the contact portion 8g comes to contact with the workpiece W when the front guide 8A rotates upwards with respect to the base unit 8. At this time, the contact portion 8g of the front guide 8A becomes parallel to the frame 8' of the base unit 8. Further, the lower side end 8ee of the front guide 8A is still contact with the workpiece W. On the other hand, a part of the side wall portion 8h of the front guide 8A is positioned inside of the protection cover 4C. That is, the cutting portion of the workpiece W is surrounded by the front guide 8A without providing any gap between the lower side end 8ee of the front guide 8A and the workpiece W.

The sidewall portions 8h, 8h slide on the inner surfaces of the dust collection cover 12 when the front guide 8A rotates upwards about the shaft 9. No gap is provided between the sidewall portion 8h and the dust collection cover 12.

How to use the electric cutter 1 to cut a groove in a workpiece W will be explained below.

To cut the work piece W by using the electric cutter 1, the user first inclines the main body 2 to the workpiece W and pushes the front end of the base unit 8 on the mark P provided on the workpiece W. At this point, the front guide 8A is biased by the spring 18 about the shaft 9, with the contact portion 8f being set in line contact with the upper surface of the workpiece W. Holding both the handle 2a and sub-handle 17, which are provided on the main body 2, the user turns the switch 6 on. The electric motor is then activated. The rotation of the motor is transmitted to the drive shaft 5 of the electric cutter 1, so that the circular saw blade 3 is rotated in the direction of arrow a (counterclockwise direction) as shown in FIG. 12. The user then pivotably moves the main body 2 about the mark P, cutting the workpiece. As a result, the base unit 8 is positioned on the workpiece W, as shown in FIG. 12.

Figure 14:
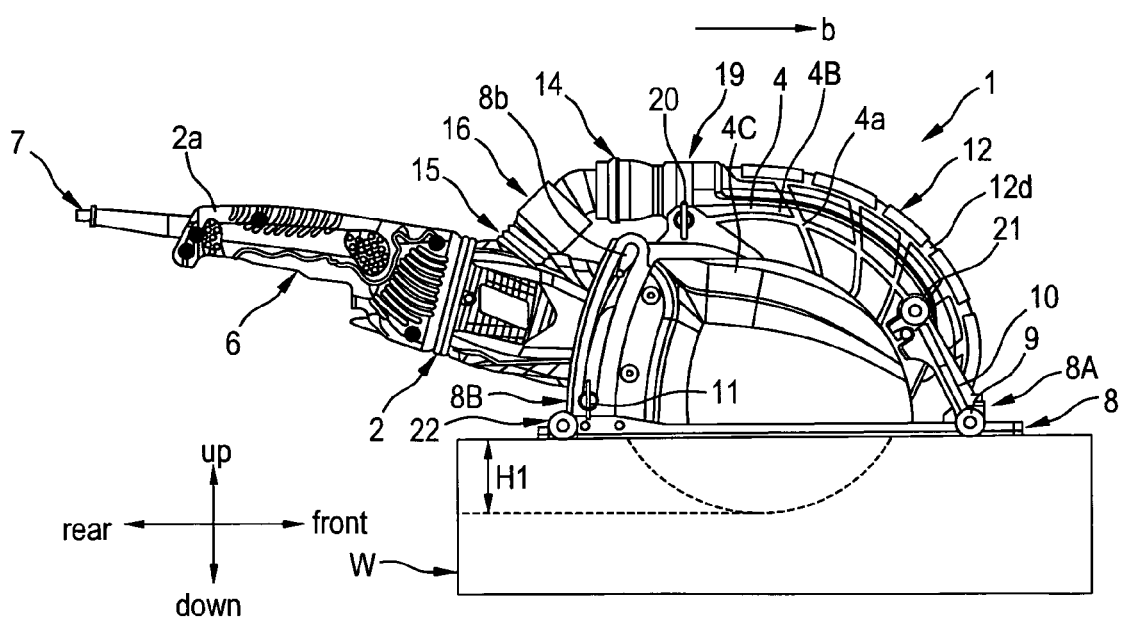
FIG. 14 is a side view showing the electric cutter cutting the workpiece at the deeper depth.

In this state, when the user moves the main body 2 in the cutting direction (the direction of arrow b), as shown in FIG. 14, a groove having the depth H1 is cut in the workpiece W.

Figure 15:
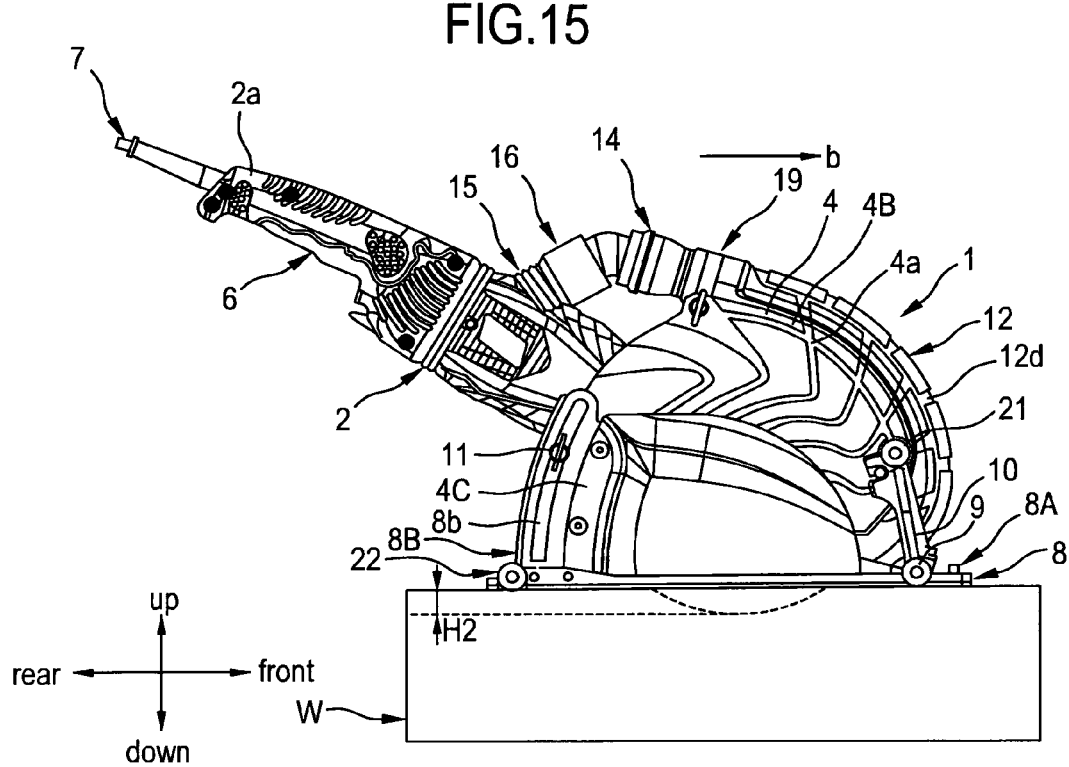
FIG. 15 is a side view showing the electric cutter cutting the workpiece at the shallower depth.

As shown in FIG. 14, the cutting depth H1 to which the blade 3 has cut the workpiece W is relatively larger. The cutting depth can be adjusted to H2 (H2<H1) if the user first loosens the adjuster 11 to move the main body 2 upwards with respect to the base unit 8 and then tightens the adjuster 11, fixing the main body 2 to the base unit 8, as shown in FIG. 15. At this time, the first protection cover 4A and the second protection cover 4B certainly move up together with the main body 2, but the third protection cover 4C remains secured to the base unit 8. Therefore, the sides of the circular saw blade 3, positioned above the base unit 8, remain covered with the second and third protection covers 4B and 4C, respectively.

On the other hand, the front guide 8A is biased by the spring 18, rotated about the shaft 9 and pushed to the workpiece W. Therefore, the front guide 8A always contacts the upper surface of the workpiece W even if the position of the main body 2 to the base unit 8 is changed.

When the blade 3 is rotated to cut the workpiece W, dust is generated. The dust is guided by the front guide 8A of the base unit 8 and is drawn into the dust passage 13 through the inlet port 12a of the dust-collecting cover 12, by virtue of the drawing force generated by the rotation of the circular saw blade 3 and the dust collector. In the dust passage 13, the dust moves to the outlet port 12b in the direction of arrow d. The dust is then drawn from the outlet port 12b into the dust collector through the adapter 14 and the hose 15. The dust is thereby collected in the dust collector.

Further, since the spring 18 biases the front guide 8A at all times, the front guide 8A is kept in contact with the workpiece W to be cut. Hence, the guide wall portion 8e and the sidewall portions 8h cover the upper surface of the workpiece W and the inlet port 12a of the dust collection cover 12 without providing any gap between the upper surface of the workpiece W, and the guide wall and the sidewall portions 8e, 8h. This structure prevents the dust from scattering from the protection cover 4 and the dust collection cover 12. Since the dust is prevented from scattering outside the protection cover 4, the work environment can be improved.

As described above, the front guide 8A that guides the dust into the inlet port 12a of the dust collection cover 12 can be pivotably movable with respect to the base unit 8, and remain in contact with the workpiece W by virtue of the bias of the spring 18. Therefore, the guide 8A always contacts the surface of the workpiece W even if the cutting depth to which the circular saw blade 3 cuts the workpiece W is changed. Hence, no gap develops between the front guide 8A and the surface of the workpiece W. The front guide 8A efficiently guides the dust flying from the circular saw blade 3 in the tangential direction thereof smoothly into the inlet port 12a of the dust collection cover 12. As a result, the dust can be collected at high efficiency without using any other cover that covers the entire circular saw blade 3. Moreover, the user can visually confirm the starting and end points of the workpiece and how the workpiece W is being cut at the start and end of cutting process, as well as during the cutting process. This process helps to enhance the work efficiency.

In the embodiment, the dust is smoothly guided into the inlet port 12a of the dust collection cover 12, while moving at a small angle relative to the workpiece W along the guide wall portion 8e of the front guide 8A. This movement of the dust can achieve a high dust-collecting efficiency.

As has been described, the main body 2 is set on the workpiece W and inclined to the workpiece W, while aligning the front end of the base unit 8 with the mark P on the workpiece W (see FIG. 11) at the start of the cutting process. The contact portion 8f of the front guide 8A which first contacts the workpiece W is configured to contact a predetermined area of the upper surface of the workpiece W. Thus, the contact portion 8f contacts the surface of the workpiece W at the start of the cutting process. This structure prevents a gap from developing between the upper surface of the workpiece W and the front guide 8A, and ultimately prevents the dust from leaking outside of the dust collection cover 12. That is, the front guide 8A smoothly guides all dust into the inlet port 12a of the dust collection cover 12.

In addition, if the length of the circular saw blade 3 projecting from the base unit 8 becomes longer, this operation increases the cutting depth. In this case, the contact portion 8g of the front guide 8A extends parallel to the lower surface of the base unit 8, because the front guide 8A is positioned above the base unit 8, as illustrated in FIG. 13. This structure develops no gap between the front guide 8A and the workpiece W. The front guide 8A can efficiently guide the dust into the inlet port 12a of the dust collection cover 12, so that the dust is efficiently collected.

Figure 16:
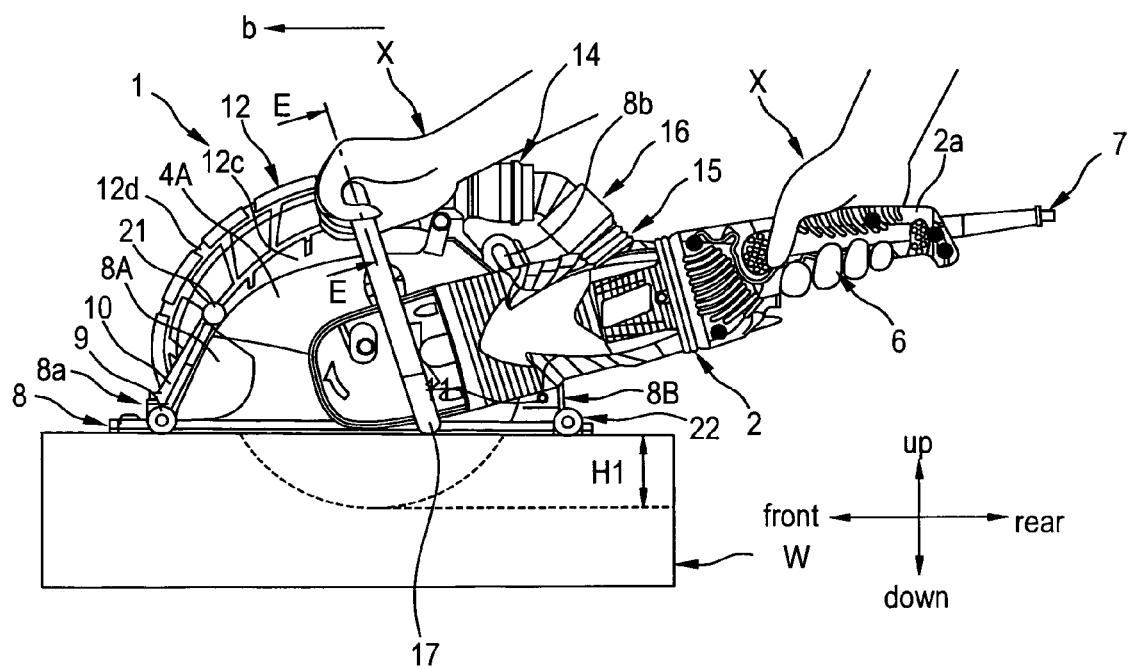
FIG. 16 is a side view showing electric cutter cutting the workpiece at the deeper depth.
Figure 17:
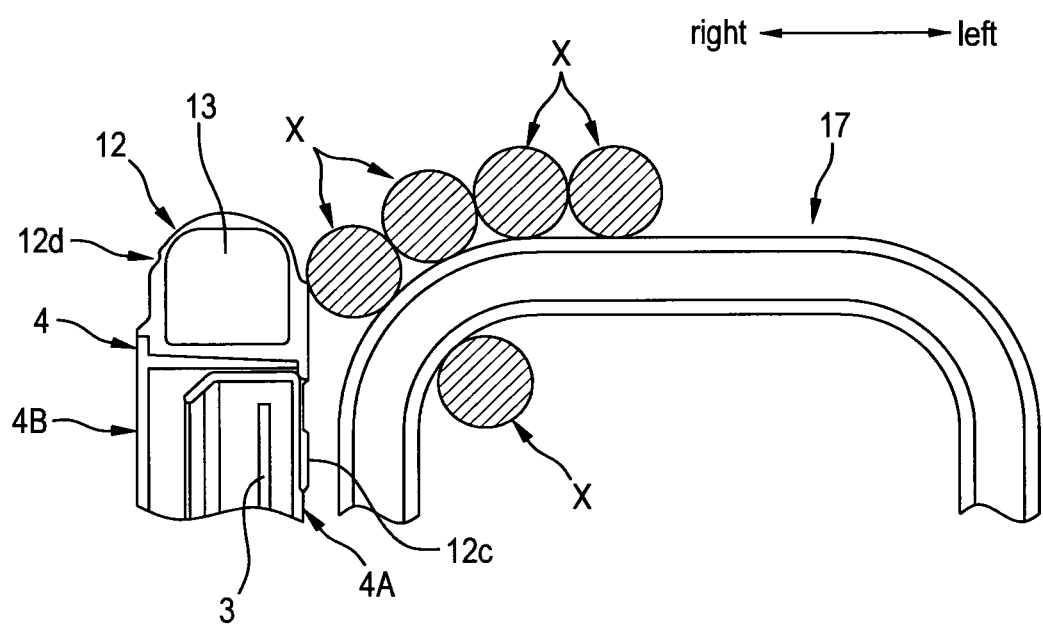
FIG. 17 is a sectional view taken along lines of E-E shown in FIG. 16.

Furthermore, since the dust collection cover 12 is made from the elastic material, the user will not be injured even if he or she hits their hands against the dust collection cover 12 while holding the main body 2. The workpiece W is not damaged, even if the dust collection cover 12 collides with the workpiece W. When the circular saw blade 3 is pushed onto the workpiece W as shown in FIGS. 16 and 17, the user usually holds the part of the sub-handle 17 which is close to the blade 3. In this case, the extension portion 12c overlaps the first protection cover 4A and prevents the user's fingers X holding the sub-handle 17 from pushing against the first protection cover 4A.

Figure 10:
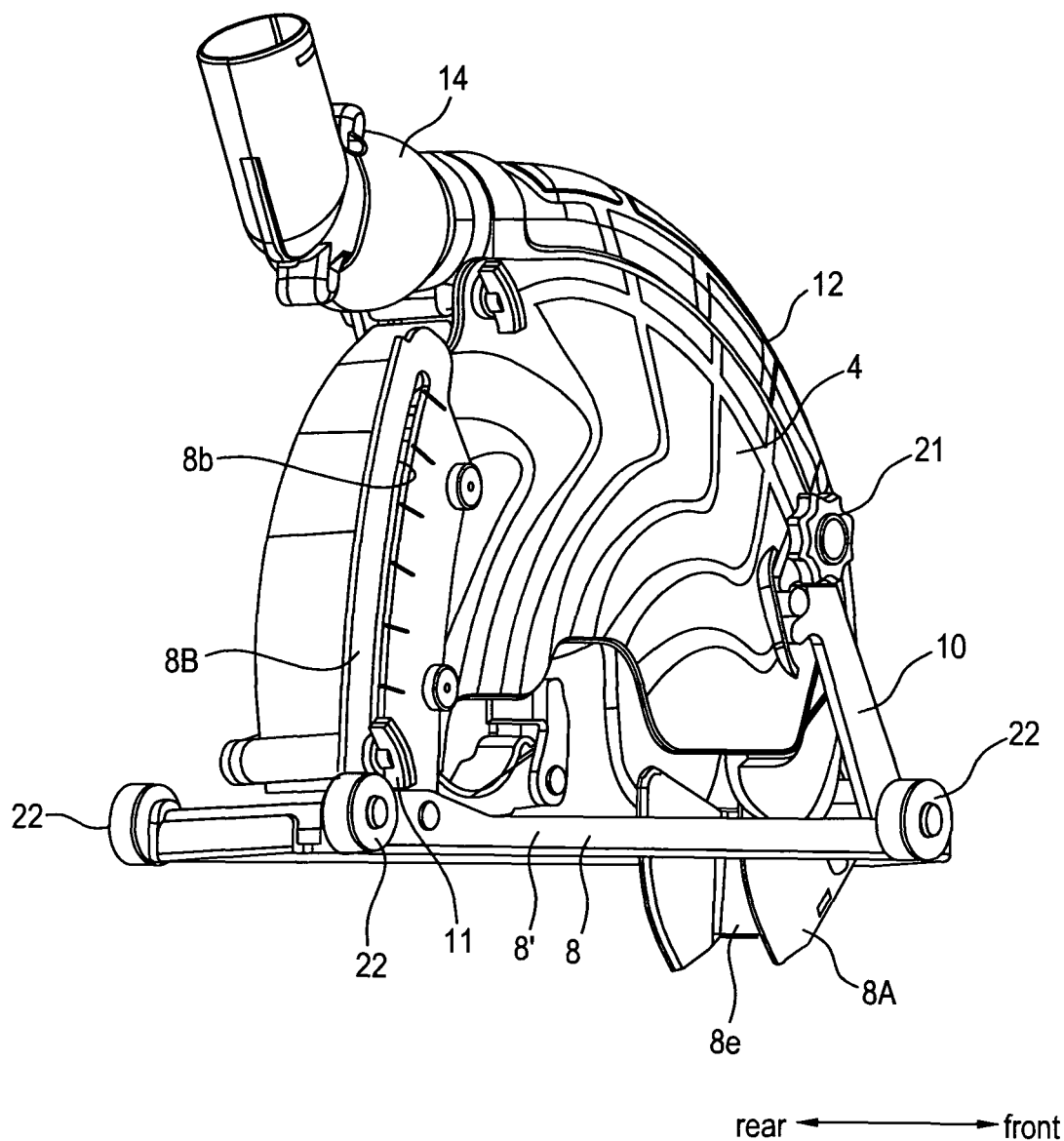
FIG. 10 is a perspective view illustrating the positional relation between the dust collection cover and the front guide.

In the embodiment, the front guide 8A is arranged inside the inlet port 12a of the dust collection cover 12 as shown in FIG. 10. The front guide 8A can therefore reliably prevent the dust collection cover 12 from contacting the circular saw blade 3 when the dust collection cover 12 is deformed. The cutting process can therefore proceed in safety.

The present invention has been described, with reference to an embodiment applied to an electric cutter. The invention is not limited to an electric cutter.

INDUSTRIAL APPLICABILITY

The invention is applicable to any types of a portable cutter, such as a disk saw, a disk grinder, which achieves the same advantages as described above.

The invention claimed is:
1. A portable cutter, comprising:
    a base member that moves on a workpiece, the base member having a shaft provided in proximity to one end thereof;
    a main body coupled to the shaft of the base member, a posture of the main body with respect to the base member being changed by moving the main body about the shaft;
    a cutting blade attached to the main body and driven to cut the workpiece, the cutting blade having an outer periphery, the cutting blade having a cutting width;
    a protection member that covers a part of the outer periphery of the cutting blade;

a dust collection member having an opening provided in proximity to the outer periphery of the cutting blade for drawing and collecting dust;

a guide member pivotably supported to the shaft of the base member for guiding the dust to the opening of the dust collection member, the guide member being projectable toward the workpiece from the base member, the guide member having a width that is wider than the cutting width of the cutting blade, and the guide member having a projection and a contact portion at a lower end, the contact portion coming to contact with the workpiece during a cutting operation, the projection being positioned opposite the contact portion with respect to the shaft of the base member, the projection protruding from the shaft of the base member in a direction away from the contact portion, and the projection having an outer surface disposed outside the protection member and accessible for pressing by an operator to manually rotate the guide member about the shaft; and urging means for urging the guide member to the workpiece, wherein the projection is biased upward by the urging means.

2. The portable cutter as claimed in claim 1, wherein the guide member comprises a guide wall portion directed to the opening of the dust collection member, the guide wall portion having a lower end and two side ends.

3. The portable cutter as claimed in claim 2, wherein:

the guide member further comprises two side wall portions coupled to the side ends of the guide wall portion, respectively, each side wall portion having a lower end; and the guide member is configured to contact the lower ends of the side wall portions and the lower end of the guide wall portion simultaneously with the workpiece when the one end of the base is contact with the workpiece for cutting.

4. The portable cutter as claimed in claim 2, wherein the lower end of the guide wall portion is kept contact with the workpiece when the guide member is positioned above the lower surface.

5. The portable cutter as claimed in claim 1, wherein the dust collection member is made from an elastic member.

6. The portable cutter as claimed in claim 5, wherein the guide member is positioned inside of the opening of the dust collection member.

7. A portable cutter, comprising:

a base member that moves on a workpiece, the base member having a shaft provided in proximity to one end thereof;

a main body coupled to the base member, a posture of the main body with respect to the base member being changeable;

a cutting blade attached to the main body and driven to cut the workpiece, the cutting blade having an outer periphery, the cutting blade having a cutting width;

a protection member that covers a part of the outer periphery of the cutting blade;

a dust collection member having an opening provided in proximity to the outer periphery of the cutting blade for drawing and collecting dust;

a guide member pivotably supported to the shaft of the base member for guiding the dust to the opening of the dust collection member, the guide member being projectable toward the workpiece from the base member, the guide member having a width that is wider than the cutting width of the cutting blade, and the guide member having a projection and a contact portion at a lower end, the contact portion coming to contact with the workpiece during a cutting operation, the projection being positioned opposite the contact portion with respect to the shaft of the base member, the projection protruding from the shaft of the base member in a direction away from the contact portion, and the projection having an outer surface disposed outside the protection member and accessible for pressing by an operator to manually rotate the guide member about the shaft; and urging means for urging the guide member to the workpiece, wherein the projection is biased upward by the urging means.

* * * * *